J. P. OGDEN.
GLASS OR LENS FOR HEADLIGHTS.
APPLICATION FILED NOV. 5, 1917.
1,271,931.
Patented July 9, 1918.
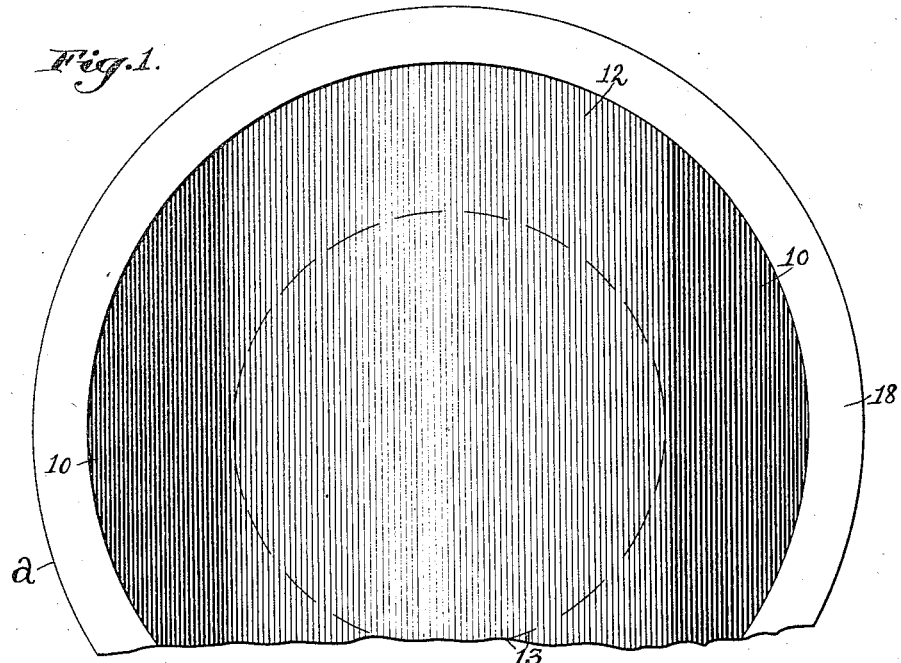
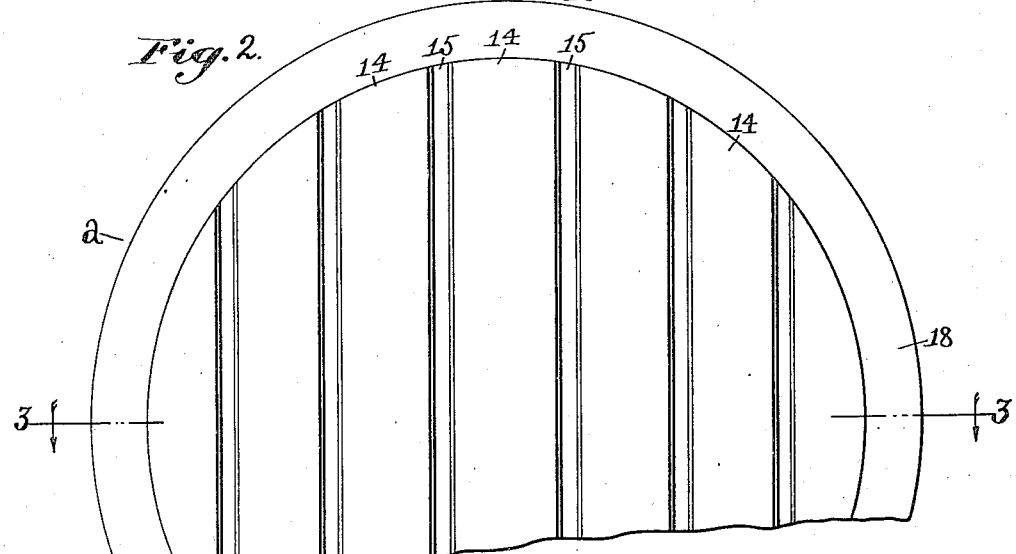
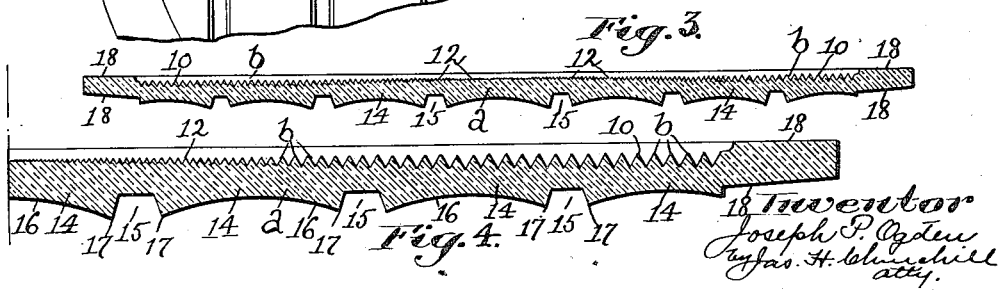

UNITED STATES PATENT OFFICE.

JOSEPH P. OGDEN, OF LYNN, MASSACHUSETTS, ASSIGNOR OF ONE-THIRD TO LAWRENCE J. KILLIAN, OF LYNN, MASSACHUSETTS.

GLASS OR LENS FOR HEADLIGHTS.

1,271,931.   Specification of Letters Patent.   Patented July 9, 1918.

Application filed November 5, 1917. Serial No. 200,224.

*To all whom it may concern:*

Be it known that I, JOSEPH P. OGDEN, a citizen of the United States, and a resident of Lynn, in the county of Essex and State of Massachusetts, have invented an Improvement in Glasses or Lenses for Headlights, of which the following description, in connection with the accompanying drawings, is a specification, like characters on the drawings representing like parts.

This invention relates to a glass or lens for headlights and particularly headlights for automobiles and the like.

The invention has for its object to provide a glass or lens of novel construction as will be described, with which a superior lighting effect of the roadway and the territory at the sides thereof may be obtained.

To this end, the glass or lens is provided on one side or surface with substantially parallel ribs or prisms, which are arranged substantially vertical when in use and which may be of uniform depth for the width of the glass but which are preferably deeper at the sides and shallower near the center, being for the best results tapered from the sides to the center of the glass or lens, whereby a substantially wide distribution laterally of the light is obtained for illuminating the gutters, sidewalks, etc., at the sides of the roadway, with a distant lighting of the roadway directly in front of the headlight. The lens or glass is preferably provided on its front side or surface with a plurality of substantially wide panels, which extend in the same direction as the ribs and are vertically arranged when in use and are separated by grooves or channels, which panels and grooves or channels assist in giving the desired distant lighting and also more or less lateral diffusion, with the result that the roadway for a maximum distance in front of the headlight and for a maximum distance transversely of the roadway is illuminated by a soft even light, which is free or substantially free from spots or shadows.

The glass or lens is designed to replace the glass of the automobile headlight now in use, and to provide the latter with a headlight with which accidents on the road at night may be avoided or at least reduced to a minimum.

The particular features of the invention will be pointed out in the claims at the end of this specification.

Figure 1 is a rear elevation of a portion of a glass or lens embodying this invention.

Fig. 2, a front elevation of the lens or glass shown in Fig. 1.

Fig. 3, a horizontal section on the line 3—3, Fig. 2, and

Fig. 4, a like section on an enlarged scale of one half of the glass shown in Figs. 1 and 2.

Referring to the drawing, *a* represents a lens or glass for the head light of an automobile or the like, which is preferably circular in shape and provided on one face or surface, preferably the rear surface, with a plurality or series of substantially parallel ribs *b* forming prisms, which may be of uniform size or depth or as is preferred may be of different sizes or depths, and which are vertically arranged when the lens is in use.

In the present instance, the glass or lens *a* is shown as provided with substantially deep prisms at its opposite sides and extending toward the center for a limited distance, as for instance, from one to two inches in a lens 9" in diameter, and said lens or glass is further provided with ribs or prisms of decreasing depth which extend from the deep prisms toward the center of the lens or glass.

The deep prisms are marked 10 and the shallower prisms are marked 12, in Figs. 1, 3 and 4.

The shallower prisms 12 may extend vertically of the glass or lens for substantially its full diameter as represented in Fig. 1, or if desired they may extend but partially the vertical diameter and within an area represented by the dotted line circle 13, in which latter case the ribs or prisms outside of said circle may be made deeper than those within the circle 13.

The glass or lens *a* may and preferably will be provided on its opposite or front face with a plurality of vertically arranged panels 14 and grooves or channels 15 separating said panels, (see Figs. 2, 3 and 4), and said panels are preferably provided with concaved front surfaces 16, which coöperate with the side walls of the grooves or channels 15 to form prisms 17 on the front surface of the glass or lens to assist in diffusing the light laterally, and said panels and grooves or channels also serve to obtain the desired distant lighting.

The lens or glass *a* may and preferably will be provided with a plain or smooth section 18 at its circumference and on its opposite surfaces, to facilitate fitting the glass or lens in the casing of the headlight, which is not hereinshown, as it is and may be such as now commonly used on automobiles.

In operation with the lens or glass hereinshown, the latter is placed in the headlight with the ribs and panels vertically arranged, and a wide diffusion of the light laterally is obtained by means of the vertically arranged prisms on the rear surface of the lens, which enables the gutters, sidewalks, etc. at the sides of the roadway to be clearly seen by the operator of the vehicle for a material distance in advance of the vehicle, and by means of the vertically arranged panels, and grooves or channels on the front side of the glass or lens the roadway in front of the vehicle is clearly illuminated for the desired or required distance, and further the panels and grooves on one surface coöperate with the vertically arranged ribs or prisms on the other surface to give a soft even light free or substantially free from spots or shadows, which light extends transversely of the roadway and also forward of the automobile for a maximum distance, and further extends laterally of the automobile for a material distance, with the result that the roadway for a substantially long distance in front of the automobile and for a substantially wide area at the sides thereof, is perfectly illuminated by a soft and uniform light, thereby enabling automobiles to be used at night with the danger of accidents reduced to a minimum.

It may be preferred to taper the size or depth of the vertically arranged ribs or prisms from near the sides to near the center of the lens or glass, as by so doing the glare from the headlight is reduced without materially interfering with the distance lighting, and this feature of the invention is capable of being used to advantage with a glass or lens in which the panels and grooves are omitted. So also it is not desired to limit the invention to the distance the shallow prisms extend vertically of the lens or glass, as they may extend substantially the full diameter of the glass or lens as indicated by the fine lines in Fig. 1 or they may terminate at the dotted line circle 13, and the portion of the ribs outside of said circle may be of greater depth.

The laterally diffused light serves also to reduce the glare from the headlight and to kill or diminish the glare from the headlights of an approaching automobile.

I have herein described one embodiment of the invention but it is not desired to limit the invention to the particular construction shown.

The laterally diffused light is not only useful for illuminating the sides of the roadway, but is highly useful in illuminating side streets leading from the roadway and curved in the road, so that the curved portion of the road or the side street may be illuminated before the automobile reaches the same or makes the turn at the curve or into the side street, thereby avoiding accidents from this source.

Claims:

1. A glass or lens provided on one surface with substantially vertically arranged prisms, and on its opposite surface with substantially vertically arranged panels of greater width than said prisms and with grooves between said panels.

2. A glass or lens provided on one surface with substantially vertically arranged prisms of different depths, and on its opposite surface with substantially vertically arranged panels and grooves between said panels.

3. A glass or lens provided on one surface at the sides thereof with substantially parallel ribs forming prisms and on its opposite surface with substantially parallel panels of greater width than said prisms and extended in the same direction as the said ribs.

4. A glass or lens provided on one surface with substantially parallel ribs of different depths with the ribs of greatest depth located on opposite sides of the center of the glass or lens and with the ribs of less depth tapering from said sides toward said center.

5. A glass or lens provided on one surface with substantially parallel ribs of different widths with the ribs of greatest width located on opposite sides of the center of the glass or lens and with the ribs of less width tapering from the sides toward said center.

In testimony whereof, I have signed my name to this specification.

JOSEPH P. OGDEN.